United States Patent
Ishiguro et al.

(10) Patent No.: US 8,531,637 B2
(45) Date of Patent: Sep. 10, 2013

(54) LIQUID CRYSTAL DISPLAY DEVICE AND MANUFACTURING METHOD THEREOF

(75) Inventors: Keisuke Ishiguro, Chiba (JP); Yoichi Shinoki, Mobara (JP)

(73) Assignees: Hitachi Displays, Ltd., Chiba (JP); Panasonic Liquid Crystal Display Co., Ltd., Hyogo (JP)

( * ) Notice: Subject to any disclaimer, the term of this patent is extended or adjusted under 35 U.S.C. 154(b) by 86 days.

(21) Appl. No.: 13/220,730

(22) Filed: Aug. 30, 2011

(65) Prior Publication Data
US 2012/0057110 A1   Mar. 8, 2012

(30) Foreign Application Priority Data
Sep. 3, 2010   (JP) ................. 2010-197325

(51) Int. Cl.
*G02F 1/1333*   (2006.01)
(52) U.S. Cl.
USPC .................... 349/138; 349/141; 349/142
(58) Field of Classification Search
USPC ..................... 349/138, 141–142
See application file for complete search history.

(56) References Cited

U.S. PATENT DOCUMENTS
2007/0298538 A1 * 12/2007 Tanabe et al. ............ 438/107

FOREIGN PATENT DOCUMENTS
JP   2007-328210   12/2007

* cited by examiner

*Primary Examiner* — Phu Vu
(74) *Attorney, Agent, or Firm* — Antonelli, Terry, Stout & Kraus, LLP.

(57) ABSTRACT

A flat, solid counter electrode is formed on an organic passivation film. Before forming an interlayer insulating film on the counter electrode, plasma ashing is performed. A surface of the organic passivation film is trimmed by the plasma ashing, forming an overhang. The plasma ashing not only trims a surface of the organic passivation film but also roughens a surface of the counter electrode. This increases a contact area between the interlayer insulating film and the organic passivation film or counter electrode, increasing the adhesiveness therebetween. Further, the plasma ashing eliminates the remainder of a resist on the counter electrode, increasing the adhesiveness of the interlayer insulating film.

13 Claims, 3 Drawing Sheets

LIQUID CRYSTAL DISPLAY DEVICE AND MANUFACTURING METHOD THEREOF

CLAIM OF PRIORITY

The present application claims priority from Japanese Patent Application JP 2010-197325 filed on Sep. 3, 2010, the content of which is hereby incorporated by reference into this application.

FIELD OF THE INVENTION

The present invention relates to a display device and in particular to an in-plane switching (IPS) liquid crystal display device which has improved reliability by preventing peeling of a film between layers.

BACKGROUND OF THE INVENTION

Liquid crystal display devices include a TFT substrate having a pixel electrode, a thin-film transistor (TFT), and the like arranged in a matrix thereon; a counter substrate disposed so that it is opposed to the TFT substrate and having a color filter and the like disposed in positions corresponding to the pixel electrode on the TFT substrate therebeneath; and liquid crystal interposed between the TFT substrate and the counter substrate. Liquid crystal display devices form an image by controlling the transmittance of light using liquid crystal molecules for each pixel.

Due to their flatness and light weight, liquid crystal display devices have been used in a wide variety of applications, including large display devices such as televisions, cellular phones, and digital still cameras (DSCs). On the other hand, they have a problem with the viewing angle characteristics. The viewing angle characteristics refer to a phenomenon where, when the screen is viewed obliquely, its luminance or chromaticity is changed from that when it is viewed from the front. In IPS liquid crystal display devices, which drive liquid crystal molecules using a lateral electric field, have excellent viewing angle characteristics.

Among various types of IPS is a type where a comb-shaped pixel electrode is disposed above a flat, solid counter electrode between an insulating film therebetween and where liquid crystal molecules are rotated by an electric field generated between the pixel electrode and the counter electrode. This type can increase the transmittance and is currently mainstream. Documents describing a liquid crystal display device of this type include JP-A-2007-328210. While there is also a configuration where a comb-shaped counter electrode is disposed above a flat, solid pixel electrode between an insulating film therebetween, the principle is the same.

A TFT substrate has a TFT, a video signal line, a scan line, and the like thereon and therefore has bumps and dips on its surface. For this reason, a thick organic passivation film having a thickness of about 2 μm is disposed thereon. In IPS, a counter electrode and a pixel electrode are disposed above a TFT substrate. The counter electrode is formed on an organic passivation film so that it is flat and solid, using indium tin oxide (ITO), which can serve as a transparent electrode. An interlayer insulating film is formed on the counter electrode using SiN. The pixel electrode is formed on the interlayer insulating film in the shape of a comb using ITO.

The interlayer insulating film is formed by CVD. In general, as a CVD film is formed under a higher temperature, the CVD film can adhere to the underlayer more strongly. Accordingly, a CVD film is typically formed at a high temperature of about 300° C. However, in liquid crystal display devices for which the present invention is targeted, an organic passivation film is previously formed below an interlayer insulating film, and CVD at a high temperature of 230° C. or more will change characteristics of the organic passivation film. Accordingly, the interlayer insulating film is formed by low-temperature CVD. On the other hand, formation of the interlayer insulating film by low-temperature CVD reduces the adhesiveness of the interlayer insulating film to the counter electrode formed therebeneath.

The interlayer insulating film formed by low-temperature CVD is etched to form a through hole. Subsequently, a pixel electrode is formed. After forming the pixel electrode, an alignment film is formed, baked, and then subjected to rubbing.

After the rubbing process, peeling of the interlayer insulating film from the counter electrode is often found. If the film is peeled during the rubbing process, the peeled film acts as a foreign matter, contaminating the rubbing process.

That is, disadvantageously, peeling of the interlayer insulating film from the counter electrode makes the liquid crystal panel nonconforming, as well as contaminates the rubbing process, reducing the manufacturing yield of the liquid crystal display device in the rubbing process.

SUMMARY OF THE INVENTION

An advantage of the present invention is to increase the adhesiveness between the counter electrode and the interlayer insulating film to prevent peeling of the interlayer insulating film from the counter electrode.

A liquid crystal display device includes: a TFT substrate having a thin-film transistor (TFT) thereon; an organic passivation film disposed so that the organic passivation film covers the TFT; a flat, solid first electrode disposed on the organic passivation film and composed of a transparent conductive film; an interlayer insulating film disposed on the first electrode; a comb-shaped second electrode disposed on the interlayer insulating film and composed of a transparent conductive film; a counter substrate; a color filter disposed beneath the counter substrate; and a liquid crystal layer interposed between the TFT substrate and the counter substrate. An upper portion of the organic passivation film is located below a lower portion of the first electrode at an edge of the first electrode.

The first electrode preferably overhangs the organic passivation film at an edge of the first electrode.

The first electrode may be a counter electrode or pixel electrode.

A method for manufacturing a liquid crystal display device configured as described above includes: (a) forming a flat, solid counter electrode by depositing indium tin oxide (ITO) on an organic passivation film and patterning the ITO; (b) performing plasma ashing on a TFT substrate after step (a); and (c), after step (b), forming an interlayer insulating film and then forming a comb-shaped pixel electrode on the interlayer insulating film using ITO.

In the above-mentioned steps, the flat, solid electrode may be a pixel electrode, and the comb-shaped electrode formed above the flat, solid electrode with the interlayer insulating film therebetween may be a counter electrode.

If the interlayer insulating film is formed by low-temperature CVD whose temperature is about 230° C., the above-mentioned steps are particularly advantageous.

According to the present invention, the adhesiveness between the counter electrode and the interlayer insulating film is increased, which can prevent peeling of the interlayer insulating film from the counter electrode. Accordingly, the manufacturing yield of the liquid crystal display device can be increased. Further, since contamination in the rubbing process due to peeling of the film can be prevented, the process yield in the rubbing process can be increased.

DESCRIPTION OF THE PREFERRED EMBODIMENTS

Now, the present invention will be described in detail using an embodiment thereof.

First Embodiment

Figure 1:
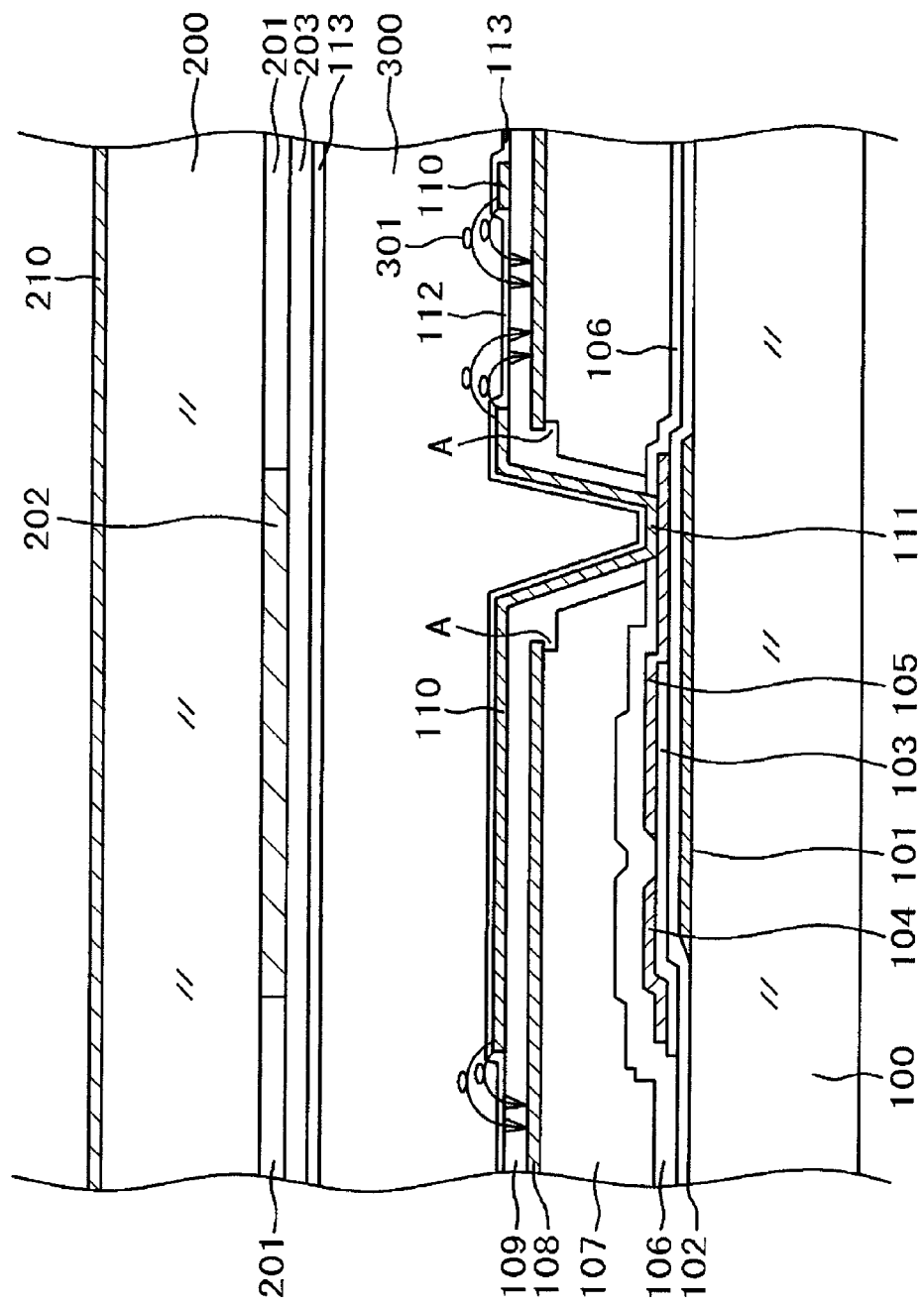
FIG. 1 is a sectional view of the display area of a liquid crystal display device.

FIG. 1 is a sectional view showing the structure of the display area of a liquid crystal display device. Various types of electrode structures have been proposed and commercialized for IPS-type liquid crystal display devices. The structure shown in FIG. 1 is a currently being used widely. Simply put, a comb-shaped pixel electrode 110 is disposed above a flat, solid counter electrode 108 with an insulating film therebetween. Rotation of liquid crystal molecules 301 using the voltage between the pixel electrode 110 and the counter electrode 108 controls the transmittance of light through a liquid crystal layer 300 for each pixel. Thus, an image is formed. Hereafter, the structure shown in FIG. 1 will be described in detail. While the present invention is described using the structure shown in FIG. 1 as an example, the invention is also applicable in exactly the same way to an IPS type where a comb-shaped counter electrode 108 is disposed above a flat, solid pixel electrode 110 with an insulating film therebetween, in contrast to FIG. 1.

In FIG. 1, a gate electrode 101 is disposed on a TFT substrate 100 made of glass. The gate electrode 101 and scan lines are disposed in the same layer. The gate electrode 101 is formed, for example, by laminating an MoCr alloy on an AlNd alloy.

A gate insulating film 102 made of SiN is disposed so that it covers the gate electrode 101. A semiconductor layer 103 composed of an a-Si film is disposed in a position opposed to the gate electrode 101 on the gate insulating film 102. The a-Si film is formed by plasma CVD and forms a channel of a TFT. A source electrode 105 and a drain electrode 104 are disposed on the a-Si film between the channel therebetween. Note that an n+Si layer (not shown) is disposed between the a-Si film and the source electrode 105 or drain electrode 104. This is intended to bring the semiconductor layer and the source electrode 105 or drain electrode 104 into ohmic contact with each other.

The source electrode 105 is commonly used by video signal lines. The drain electrode 104 is connected to the pixel electrode 110. The source electrode 105 and the drain electrode 104 are simultaneously formed in the same layer. An inorganic passivation film 106 made of SiN is disposed so that it covers the TFT. The inorganic passivation film 106 protects the TFT, particularly, its channel against impurities. Disposed on the inorganic passivation film 106 is an organic passivation film 107. The organic passivation film 107 is formed thickly in order to protect the TFT as well as flatten the surface. The thickness is 1 to 4 μm. The organic passivation film 107 has a through hole.

The organic passivation film 107 is made of a photosensitive resin such as an acrylic resin or silicon resin. Use of the photosensitive resin is advantageous in that processes such as resist application can be omitted. Specifically, a photosensitive resin is applied and then pre-baked and thus solidified. In this state, it is directly exposed to light using a mask. The through hole is formed, for example, by exposing to light a portion corresponding to the through hole and dissolving the exposed portion in a developer. After the through hole is formed, the organic passivation film 107 is baked and solidified. The baking is performed at about 230° C. The organic passivation film 107 is important since it protects the TFT or flattens the surface. However, if it undergoes a process at a high temperature exceeding the baking temperature in the aftertreatment, the organic passivation film 107 will be degraded. For this reason, the temperature condition of the aftertreatment is limited.

The counter electrode 108 is formed by depositing amorphous indium tin oxide (ITO), which can serve as a transparent conductive film, on the organic passivation film 107 by sputtering, patterning the amorphous ITO using a photoresist, then etching it using oxalic acid, and then annealing the amorphous ITO at 230° C. so that it is polycrystallized and thus reducing its electrical resistance. The counter electrode 108 is formed so that it avoids the through hole and is flat and solid. The thickness of the counter electrode 108 is, e.g., 77 μm.

Subsequently, an interlayer insulating film 109 is formed by CVD so that it covers the counter electrode 108. The temperature condition for this CVD is about 230° C. Such CVD is called "low-temperature CVD." The interlayer insulating film 109 is then patterned in the photolithography process.

Generally, in forming a film by CVD, the temperature of the substrate is kept at 300° C. or more. As a CVD film or the like is formed under a higher temperature, the CVD film or the like can adhere to the underlayer more strongly. However, since the organic passivation film 107 is previously formed below the interlayer insulating film 109 in the structure shown in FIG. 1, CVD at a high temperature exceeding 230° C. changes characteristics of the organic passivation film 107. For this reason, the interlayer insulating film 109 is formed by low-temperature CVD whose temperature is about 230° C. On the other hand, the formation of the interlayer insulating film 109 by low-temperature CVD reduces the adhesiveness of the interlayer insulating film 109 to other films, in particular, the counter electrode 108.

In the present invention, in order to increase the adhesiveness between the counter electrode 108 and the interlayer insulating film 109, plasma ashing is performed on respective surfaces of the counter electrode 108 and the organic passivation film 107 using oxygen after forming the counter electrode 108 and before forming the interlayer insulating film 109 by CVD. Since plasma ashing intensively acts on organic films among others, a portion of the organic passivation film 107 is exposed like a surface of the organic passivation film 107 is slightly etched. Thus, overhangs are formed as shown by edges and their vicinities of the counter electrode 108, A portions, in FIG. 1.

As seen, in the present invention, plasma ashing is performed after forming the counter electrode 108 and before forming the interlayer insulating film 109. Subsequently, the interlayer insulating film 109 is formed by low-temperature CVD. Subsequently, the interlayer insulating film 109 and the inorganic passivation film 106 are etched to form a through hole 111. Subsequently, ITO, which can serve as a transparent conductive film, that is, as the pixel electrode 110, is deposited so that it covers the interlayer insulating film 109 and the through hole 111 and then patterned.

The pixel electrode 110 is so-called comb-shaped. There are slits 112 between the comb-shaped electrodes. A given voltage is applied to the counter electrode 108, while a voltage based on a video signal is applied to the pixel electrode 110. As shown in FIG. 1, application of a voltage to the pixel electrode 110 generates an electric line of force to rotate the liquid crystal molecules 301, thereby controlling the transmission of light from the backlight. Since the transmission of light from the backlight is controlled for each pixel, an image is formed. Disposed above the pixel electrode 110 is a TFT substrate-side alignment film 113 for aligning the liquid crystal molecules 301.

In the example of FIG. 1, the flat, solid counter electrode 108 is disposed on the organic passivation film 107, and the comb-shaped pixel electrodes 110 are disposed on the interlayer insulating film 109. Conversely, a flat, solid pixel electrode 110 may be disposed on the organic passivation film 107, and a comb-shaped counter electrode 108 may be disposed on the interlayer insulating film 109. The present invention is also applicable to such a configuration in exactly the same way.

In FIG. 1, a counter substrate 200 is disposed with the liquid crystal layer 300 interposed between the counter substrate 200 and the TFT substrate 100. Disposed beneath the counter substrate 200 is a color filter 201. A black matrix 202 increases the contrast between images, as well as serves as a shading film for the TFT to prevent passage of a photocurrent through the TFT.

An overcoat 203 is disposed beneath the color filter 201 and the black matrix 202. The color filter 201 and the black matrix 202 have bumps and dips on surfaces thereof. For this reason, the overcoat 203 flattens the surfaces. Disposed beneath the overcoat 203 is an alignment film 113 for determining the initial alignment of the liquid crystal molecules 301.

Disposed outside the counter substrate 200 is an external conductive film 210 formed by sputtering ITO. The external conductive film 210 is intended to stabilize an electric field within the liquid crystal display panel.

Figure 2:
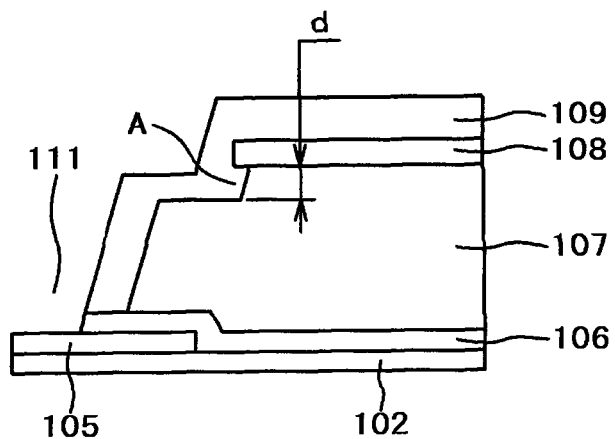
FIG. 2 is a sectional view showing the relationship between an organic passivation film, a counter electrode, and an interlayer insulating film in the present invention.

FIG. 2 is an enlarged sectional view of a portion around the through hole of the TFT substrate of FIG. 1. FIG. 2 omits the portion below the gate insulating film 102 and the portion above the interlayer insulating film 109. In FIG. 2, the source electrode 105 extending from the TFT is disposed beneath the through hole. The inorganic passivation film 106 is disposed so that it covers the gate insulating film 102 and the source electrode 105. The organic passivation film 107 is disposed on the inorganic passivation film 106. The counter electrode 108 is disposed on the organic passivation film 107.

In the present invention, after forming the organic passivation film 107, plasma ashing is performed. Since plasma ashing intensively acts on organic films among others, the organic passivation film 107 is trimmed, forming an overhang as shown by an A portion in FIG. 2. Simultaneously, the upper portion of the organic passivation film 107 is trimmed so that it is located below the lower portion of the counter electrode 108. The length by which the organic passivation film 107 is trimmed in the vertical direction, that is, d shown in FIG. 2 is 10 nm or more and 100 nm or less. This plasma ashing is only required to be performed for about 1 minute. Accordingly, execution of plasma ashing does not significantly increase the process time.

Figure 3:
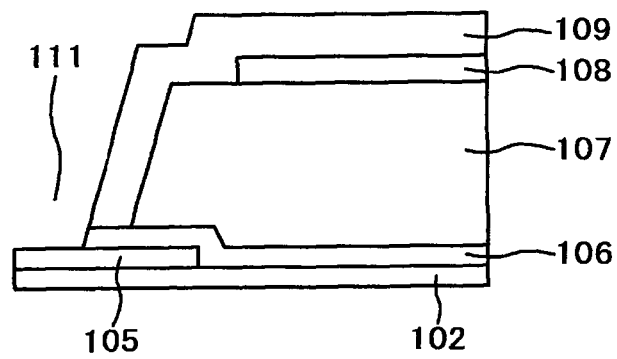
FIG. 3 is a sectional view showing the relationship between an organic passivation film, a counter electrode, and an interlayer insulating film in a conventional structure.

FIG. 3 is an enlarged sectional view of a portion around the through hole of the TFT substrate in a conventional configuration. In FIG. 3, the edge of the counter electrode 108 is not formed into an overhung. That is, a feature of the shape of the present invention is that the edge of the counter electrode 108 is formed into an overhang, as shown in FIG. 2. The formation of the overhang shown by the A portion increases the contact area between the interlayer insulating film 109 and the organic passivation film 107 or counter electrode 108. This can prevent peeling of the interlayer insulating film 109.

Further, execution of plasma ashing following the patterning of the counter electrode 108 can advantageously completely eliminate the remainder of the resist on the counter electrode 108. The remainder of the resist may cause peeling of the film. In this regard, execution of plasma ashing following the formation of the counter electrode 108 according to the present invention is significantly advantageous.

Figure 4:
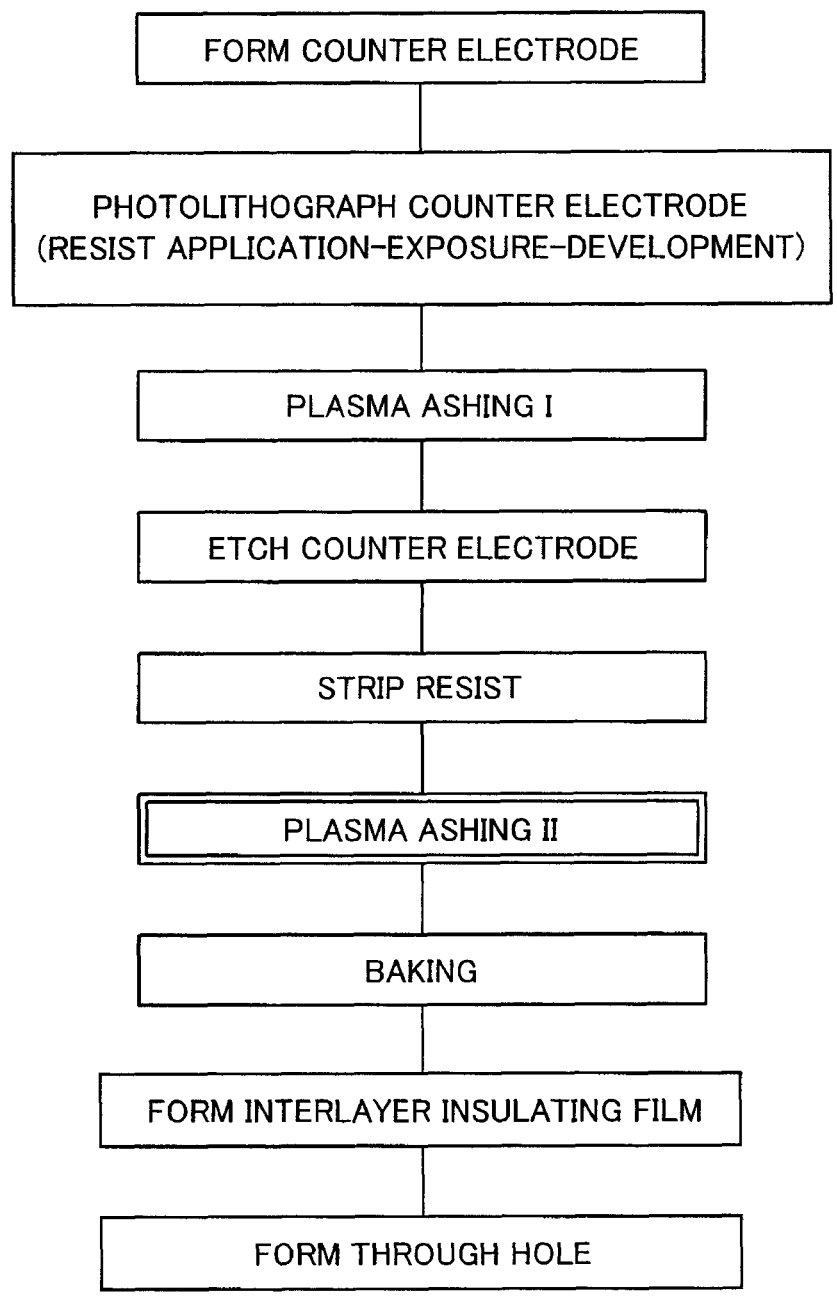
FIG. 4 is a flowchart showing a manufacturing method according to the present invention.

FIG. 4 is a flowchart showing a process related to the configuration of the present invention. In FIG. 4, first, the counter electrode 108 is formed by sputtering ITO. Subsequently, a resist is applied to the counter electrode 108, which is then exposed to light and developed. Subsequently, first plasma ashing, plasma ashing I, is performed. The purpose of the plasma ashing I is to eliminate the remainder of the resist after the development. Subsequently, the counter electrode 108 is etched using, e.g., oxalic acid. Specifically, the area of the through hole and around the through hole, of the counter electrode 108 is etched. After the etching, the resist is striped.

After the resist is stripped, second plasma ashing, plasma ashing II, is performed. Execution of the plasma ashing II is a feature of the present invention. The surface of the organic passivation film 107 is trimmed by the plasma ashing II. Alternatively, the respective surfaces of the counter electrode 108 and the organic passivation film 107 are roughened by the plasma ashing II. Thus, the adhesiveness between these films and the interlayer insulating film 109 to be formed later is increased. The plasma ashing II has another advantage that it eliminates the remainder of the resist on the counter electrode 108. This can also increase the adhesiveness.

After performing the plasma ashing II in this way, the entire TFT substrate is baked at about 230° C. The baking is intended to anneal the counter electrode made of ITO. The ITO deposited by sputtering is amorphous and has high electrical resistance. For this reason, annealing is performed to reduce the electrical resistance.

After forming the counter electrode 108 in this way, the interlayer insulating film 109 is formed using SiN. Subsequently, the interlayer insulating film 109 and the inorganic passivation film 106 are etched within the previously formed through hole of the organic passivation film 107. Thus, the through hole 111 is formed. The pixel electrode 110 and the source electrode 105 are electrically connected to each other via the through hole 111.

As seen, according to the present invention, the counter electrode 108 is etched, the resist is stripped, and then plasma ashing is performed for a short period of time. This can prevent peeling of the interlayer insulating film 109, significantly increasing the manufacturing yield of the liquid crystal display device.

What is claimed is:
1. A liquid crystal display device comprising:
   a TFT substrate having a thin-film transistor (TFT) thereon;

an organic passivation film disposed so that the organic passivation film covers the TFT;
a flat, solid first electrode disposed on the organic passivation film and composed of a transparent conductive film;
an interlayer insulating film disposed on the first electrode;
a comb-shaped second electrode disposed on the interlayer insulating film and composed of a transparent conductive film;
a counter substrate;
a color filter disposed beneath the counter substrate; and
a liquid crystal layer interposed between the TFT substrate and the counter substrate,
wherein an edge of the first electrode extends beyond an adjacent side of an upper portion of the organic passivation film on which the first electrode is disposed.

2. The liquid crystal display device according to claim 1, wherein the adjacent side of the upper portion of the organic passivation film extends from a lower portion of the first electrode by 10 to 100 nm at the edge of the first electrode.

3. A liquid crystal display device comprising:
a TFT substrate having a thin-film transistor (TFT) thereon;
an organic passivation film disposed so that the organic passivation film covers the TFT;
a flat, solid first electrode disposed on the organic passivation film and composed of a transparent conductive film;
an interlayer insulating film disposed on the first electrode;
a comb-shaped second electrode disposed on the interlayer insulating film and composed of a transparent conductive film;
a counter substrate;
a color filter disposed beneath the counter substrate; and
a liquid crystal layer interposed between the TFT substrate and the counter substrate,
wherein the first electrode overhangs the organic passivation film at an edge of the first electrode.

4. The liquid crystal display device according to claim 1, wherein the first electrode is a counter electrode.

5. The liquid crystal display device according to claim 3, wherein the first electrode is a counter electrode.

6. The liquid crystal display device according to claim 1, wherein the first electrode is a pixel electrode.

7. The liquid crystal display device according to claim 3, wherein the first electrode is a pixel electrode.

8. A method for manufacturing a liquid crystal display device, the liquid crystal display device including a TFT substrate, a counter substrate, and a liquid crystal layer, the TFT substrate having a thin-film transistor (TFT) thereon, the TFT being covered by an organic passivation film, the counter substrate having a color filter therebeneath, the liquid crystal layer being interposed between the TFT substrate and the counter substrate, the method comprising the steps of:
(a) forming a flat, solid counter electrode by depositing indium tin oxide (ITO) on the organic passivation film and patterning the ITO;
(b) performing plasma ashing on the TFT substrate after step (a); and
(c), after step (b), forming an interlayer insulating film and then forming a comb-shaped pixel electrode on the interlayer insulating film using ITO.

9. A method for manufacturing a liquid crystal display device, the liquid crystal display device including a TFT substrate, a counter substrate, and a liquid crystal layer, the TFT substrate having a thin-film transistor (TFT) thereon, the TFT being covered by an organic passivation film, the counter substrate having a color filter therebeneath, the liquid crystal layer being interposed between the TFT substrate and the counter substrate, the method comprising the steps of:
(a) forming a flat, solid pixel electrode by depositing indium tin oxide (ITO) on the organic passivation film and patterning the ITO;
(b) performing plasma ashing on the TFT substrate after step (a); and
(c), after step (b), forming an interlayer insulating film and then forming a comb-shaped counter electrode on the interlayer insulating film using ITO.

10. The method according to claim 8, wherein the interlayer insulating film is formed by chemical vapor deposition (CVD).

11. The method according to claim 9, wherein the interlayer insulating film is formed by chemical vapor deposition (CVD).

12. The method according to claim 8, wherein step (b) of performing plasma ashing on the TFT substrate results in an edge of the counter electrode extending beyond an adjacent side of an upper portion of the organic passivation film on which the counter electrode is formed.

13. The method according to claim 9, wherein step (b) of performing plasma ashing on the TFT substrate results in an edge of the pixel electrode extending beyond an adjacent side of an upper portion of the organic passivation film on which the pixel electrode is formed.

* * * * *